March 22, 1966 G. J. GANLEY ET AL 3,242,058
MATTER MANAGEMENT SYSTEMS
Filed Feb. 1, 1960 5 Sheets-Sheet 1

INVENTORS
GREGORY J. GANLEY
JEAN R. NELSON

BY *George W. Field*

ATTORNEY

INVENTORS
GREGORY J. GANLEY
JEAN R. NELSON
BY George W Field
ATTORNEY

March 22, 1966 G. J. GANLEY ET AL 3,242,058
MATTER MANAGEMENT SYSTEMS
Filed Feb. 1, 1960 5 Sheets-Sheet 3

INVENTORS
GREGORY J. GANLEY
JEAN R. NELSON
BY George W. Field
ATTORNEY

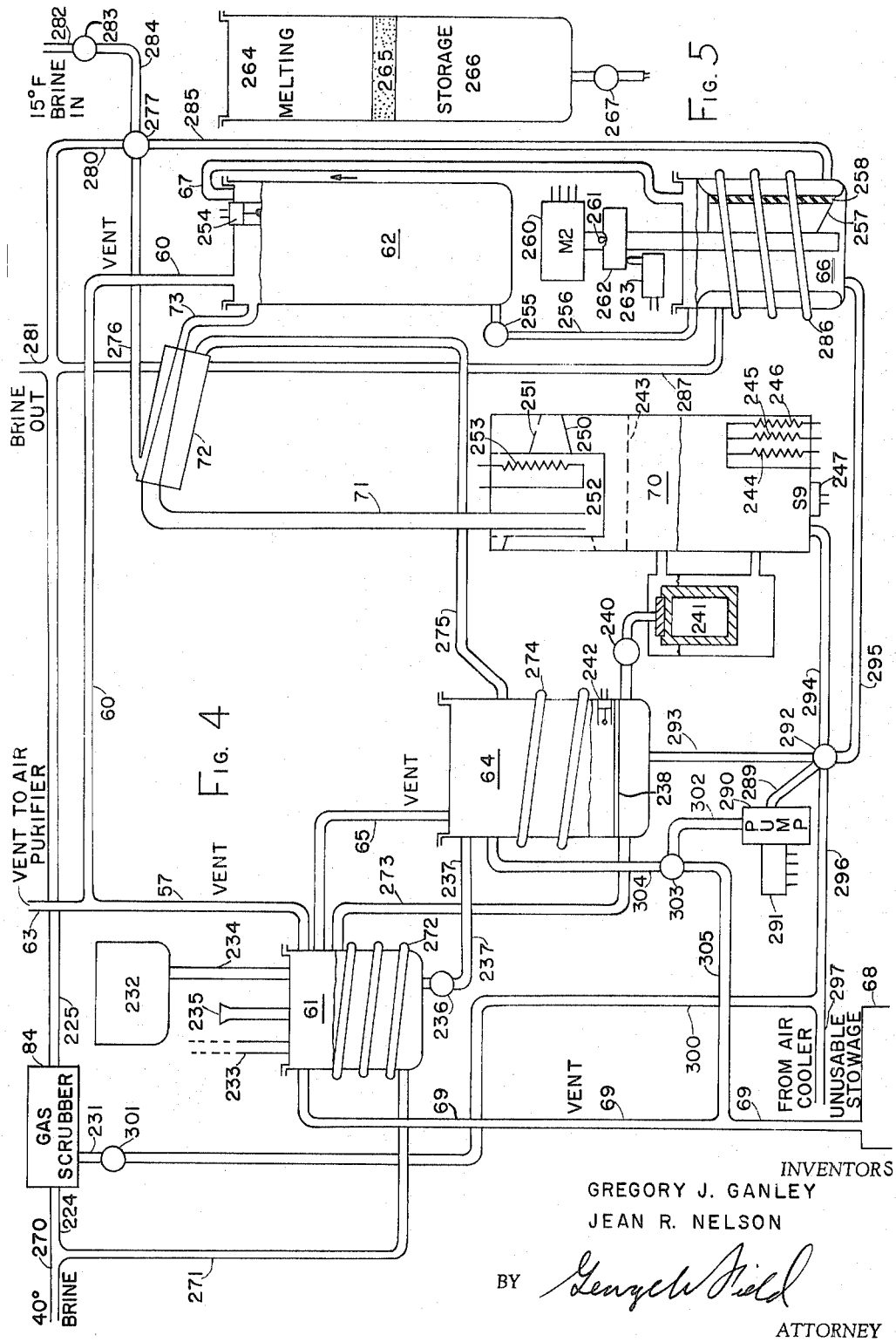

INVENTORS
GREGORY J. GANLEY
JEAN R. NELSON
BY
ATTORNEY

United States Patent Office 3,242,058
Patented Mar. 22, 1966

3,242,058
MATTER MANAGEMENT SYSTEMS
Gregory J. Ganley, Minneapolis, and Jean R. Nelson, White Bear, Minn., assignors to Honeywell Inc., a corporation of Delaware
Filed Feb. 1, 1960, Ser. No. 6,027
4 Claims. (Cl. 202—176)

One of the already recognized problems which has been greatly emphasized by the requirements of impending space travel is that of providing a sealed environment in which man can live for extended periods. The difficulties presented by this problem increase with the length of the period, and with any space and waste limitation on the apparatus. The maintenance of such an environment over long periods of time requires management of energy and management of matter: the present invention is directed to the management of matter in systems which remain closed, at least to the entry of new matter, for periods measured in weeks, the length of the period being limited by the available storage facilities for food, water, and certain compressed gases, and by the absorption capacity of certain air purifier beds.

The objects of the invention are to provide improved apparatus for matter management in sealed environments, to provide improved air and water purifying means for such environments, and to provide solid waste disposal means for use in such environments in combination with the purifying means just mentioned.

Various other objects, advantages, and features of novelty not particularly enumerated above which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

Figure 1:
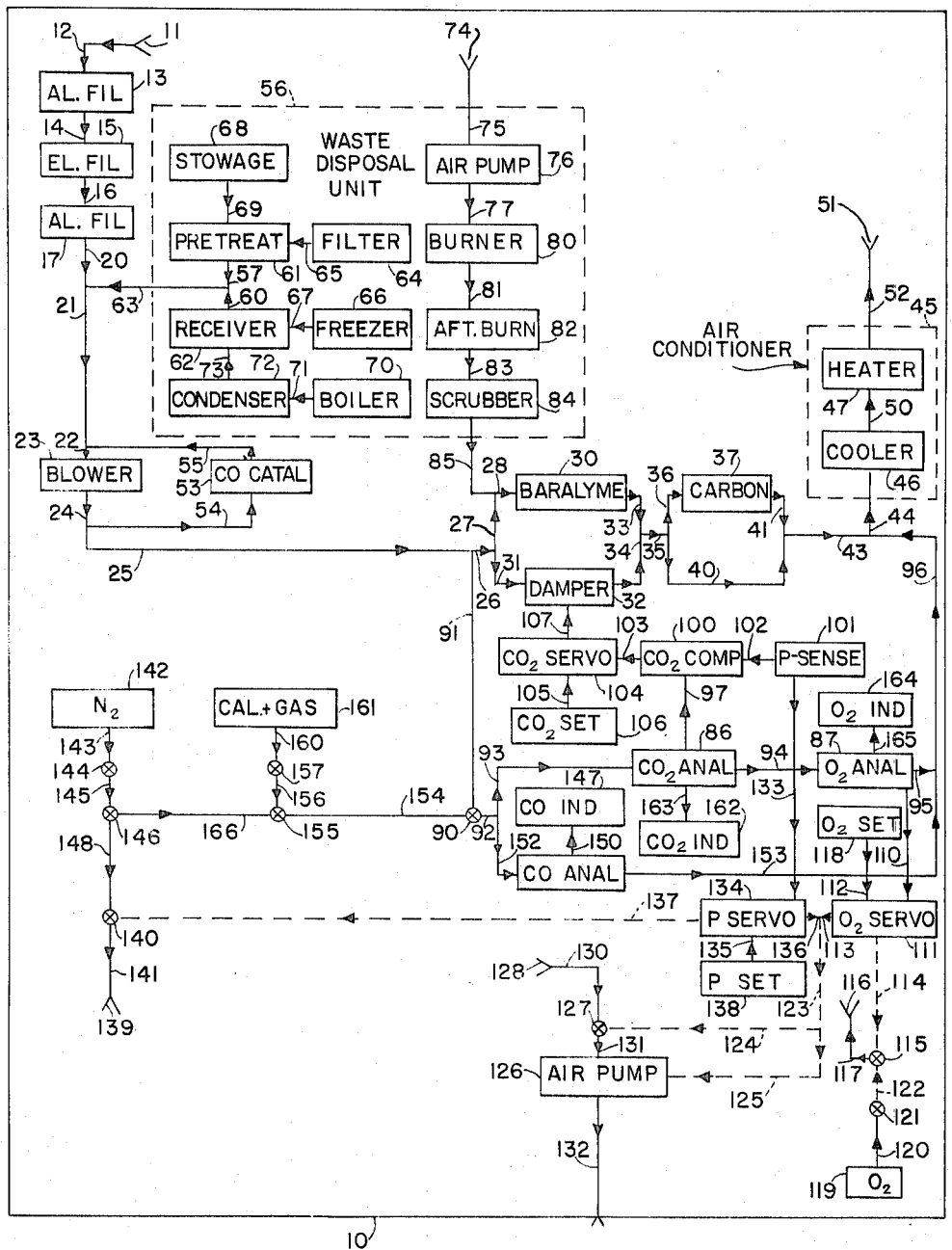
Figure 2:
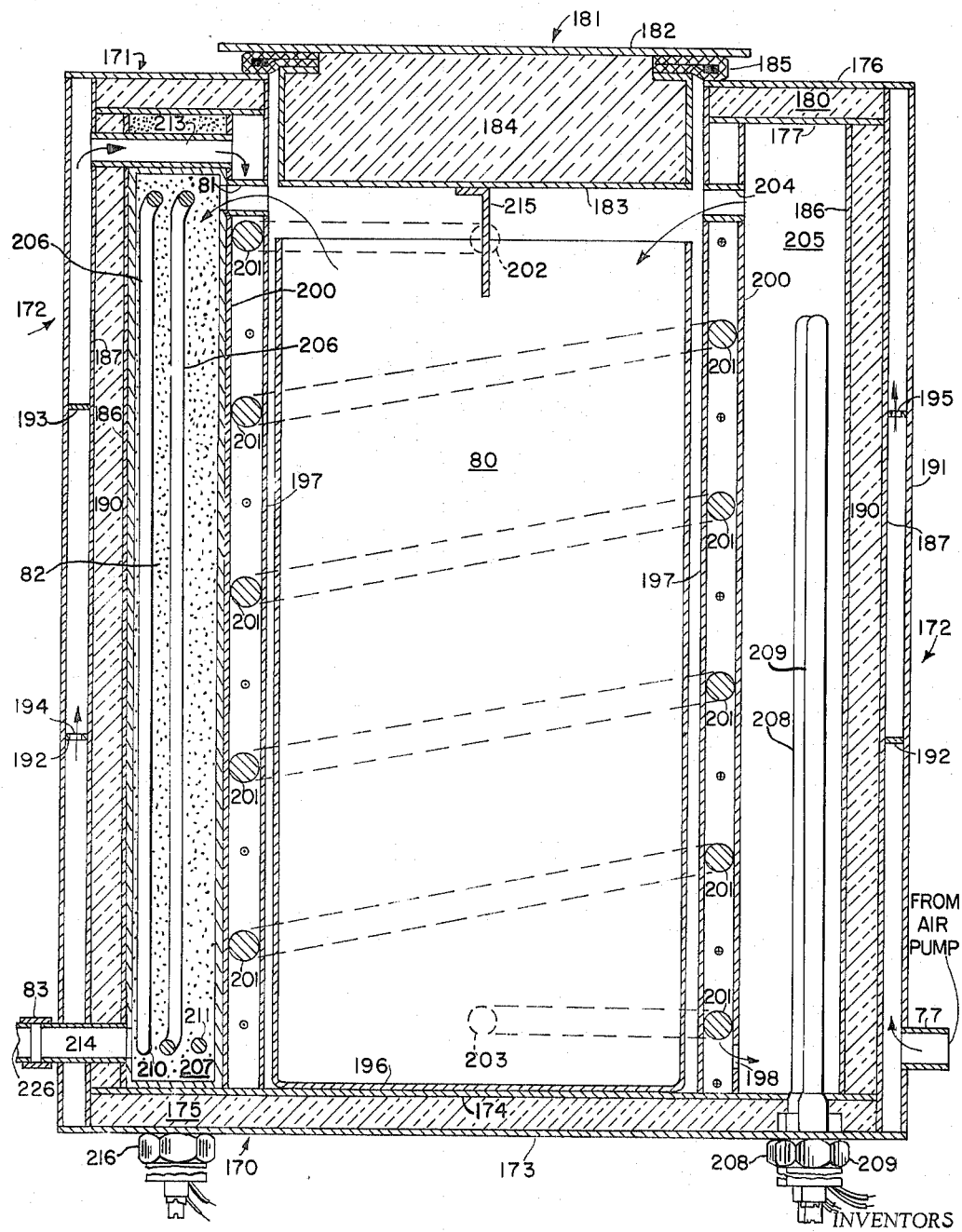
Figure 3:
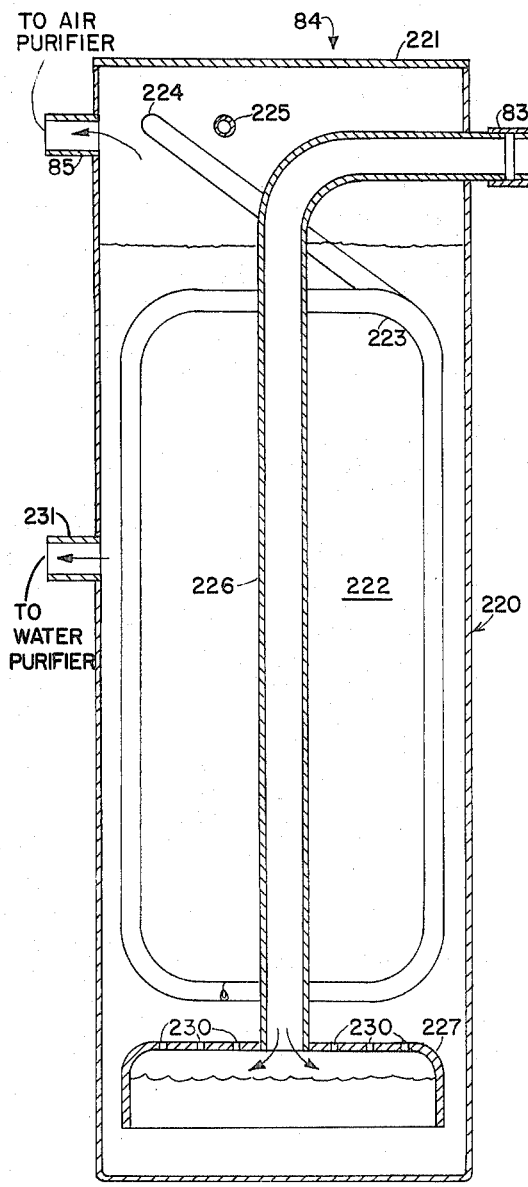
Figure 7:
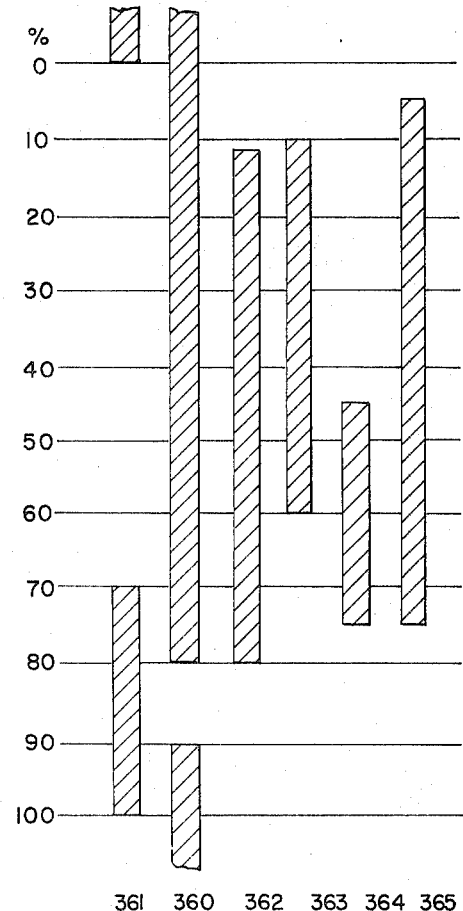
Figure 6:
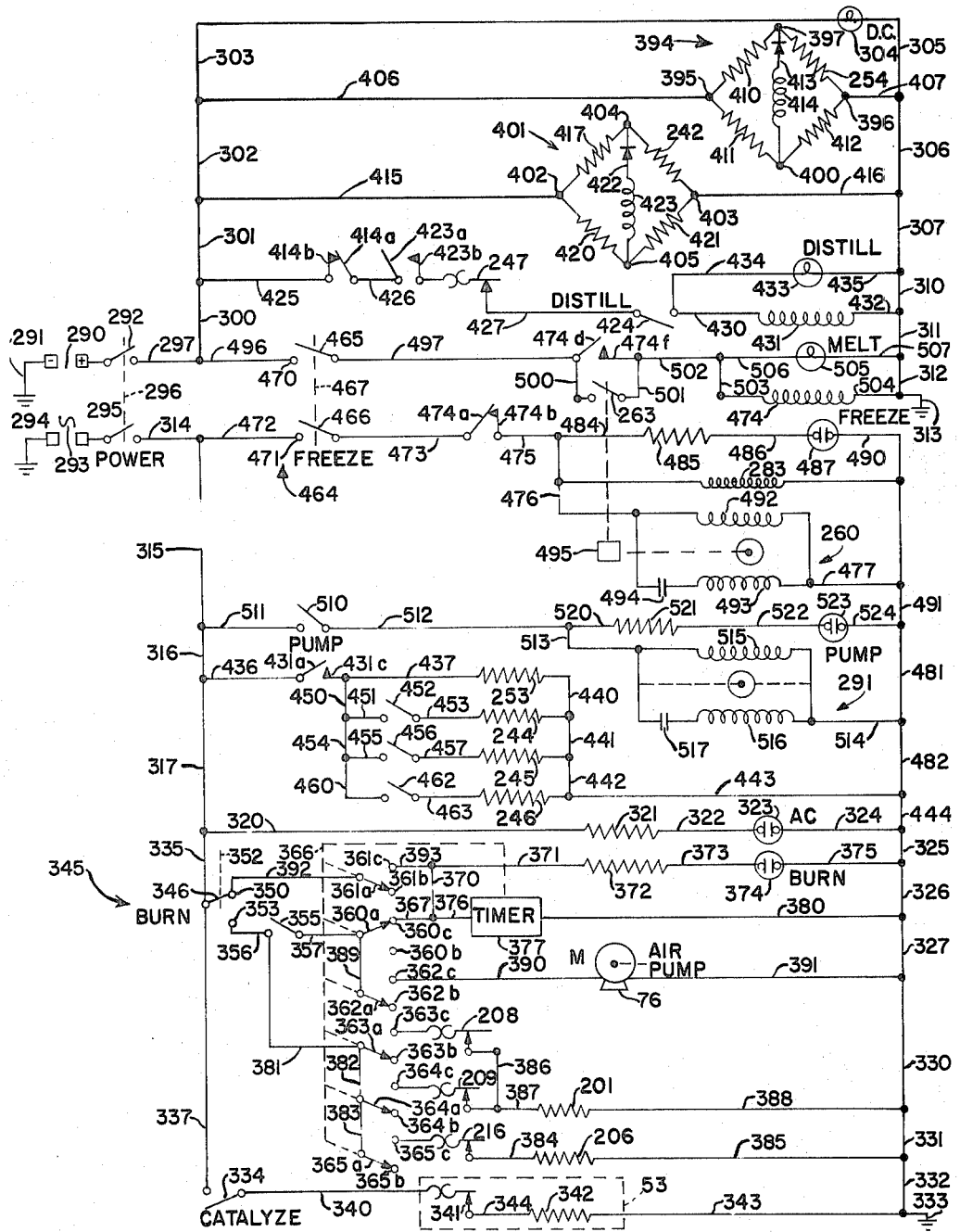

FIGURE 1 shows the air purifying apparatus of our invention schematically, FIGURES 2 and 3 show the solid waste disposal apparatus, FIGURES 4 and 5 show the water purifying apparatus, FIGURE 6 shows the electrical circuitry related to FIGURES 1, 2, 3, and 4, and FIGURE 7 is a diagram illustrating the operation of a timer in FIGURE 6.

An embodiment of the invention on which the present application is based comprises a closed steel shell fitted for occupancy by two men for continuous intervals in the neighborhood of 30 days, under reduced atmospheric pressures.

In FIGURE 1 the boundary of the sealed environment, that is, the shell of the chamber, is identified by the reference numeral 10, and all the apparatus shown in FIGURE 1 is contained within the system.

Since the management of energy is not a part of the present invention, it is understood that electrical energy is supplied to the equipment as necessary through hermetically sealed connectors, and that heat energy may be transferred between the shell and the surrounding air. Air conditioning equipment within the shell is necessary, but this is basically an energy management detail, and is shown only incidentally in the present application in that the air must pass through the air conditioner, and that water condensed therein must be included in the water purifying system.

In the air purifier, air is drawn for the system at 11 through conduit 12, an aluminum foil filter 13, conduit 14, an electrostatic filter 15, conduit 16, a second aluminum foil filter 17, and conduits 20, 21, and 22 by a blower 23. From the blower the air passes through conduits 24, 25 and 26, to a T joint where it divides, a first portion passing through conduit 28 to a Baralyme bed 30 where carbon dioxide is absorbed, and a second portion passing through conduit 31 and a damper 32. Adjustment of damper 32 determines the portion of the total air which bypasses the Baralyme bed, and hence varies the carbon dioxide absorption rate of the system.

From Baralyme bed 30 and damper 32 air passes through conduits 33 and 34, respectively, to a mixing plenum 35, and thence through conduit 36 and an activated carbon absorption bed 37 bypassed by conduit 40. It has been found that a fixed bypass arrangement is satisfactory here. The air from bed 37 is fed through conduit 41 to a T joint where it is mixed with air from conduit 40 and thence passes through conduits 43 and 44 to air conditioner 45, which includes a cooler 46 and a heater 47 interconnected by a conduit 50. From heater 47 the air is returned to the system at 51 through conduit 52.

The need for the air purifier is of course due to the presence of men in the system. Their metabolism converts oxygen to carbon dioxide and introduces water vapor and body and other odors. Cooking, smoking, etc., introduce further air contaminants so that the air purification problem involves removal of solid particles, odors, and carbon monoxide, absorption of excess carbon dioxide, and replacement of consumed oxygen, as well as maintenance of desired atmospheric pressure and tolerable relative humidity.

Removal of carbon monoxide is accomplished by a carbon monoxide catalyzer 53 connected directly across blower 23 by conduits 54 and 55. Catalyzer 53 contains a mixture of Hopcalite and fiberglass which, when heated by an electric heater as will be described in connection with FIGURE 6, oxidizes the carbon monoxide in the air passing through the catalyzer to carbon dioxide. The amount of the latter resulting from this process is relatively small, and it is disposed of an Baralyme bed 30 with other excess carbon dioxide.

Also shown in FIGURE 1 is a waste disposal unit 56, of which greater detail is given in FIGURES 2 through 5. The water purifying portion of this unit is vented to conduit 21 through conduits 57 and 60, connected to a pretreatment chamber 61 and receiver 62, respectively, and conduit 63. A filter 64 is vented through conduit 65 and pretreatment chamber 61, an unusable water stowage container 68 is vented through conduit 69 and pretreatment chamber 61, a freezer 66 is vented through conduit 67 and receiver 62, and a boiler 70 is vented through conduit 71, a condenser 72, conduit 73 and receiver 62.

The solid waste disposal portion of unit 56 draws air from the system at 74 through conduit 75 by an air pump 76, from which the air passes through conduit 77, a burner 80, conduit 81, an afterburner 82, conduit 83, a scrubber 84, and conduit 85 to conduit 28. Thus the gaseous products of the drying and combustion of solid wastes are never allowed to enter the general system at all, but are at once passed to the air purifier. It will be appreciated that the elements making up the solid waste disposal apparatus are not in continuous operation, but are used intermittently when sufficient waste has accumulated.

The regulation of carbon dioxide absorption and oxygen replacement is controlled by apparatus including a carbon dioxide analyzer 86 and an oxygen analyzer 87. In the normal position of a three-way valve 90 air is blown from conduit 25 through conduit 91, valve 90, conduits 92 and 93, analyzer 86, conduit 94, analyzer 87, and conduits 95 and 96 to conduit 44. Analyzer 86 is a commercially available unit which supplies an output 97, representative of the partial pressure of carbon dioxide in the air flowing through the analyzer, to a carbon dioxide computer 100. Pressure sensor 101 supplies an output 102 to computer 100 representative of the total pressure in the system, since analyzer 86 is of such a nature that its output 97 is subject to undesired variation with total pressure. Computer 100 supplies an output 103, representative of the partial pressure of carbon dioxide in the air supplied in conduit 91, to a carbon dioxide servo 104, which receives a second output 105 from a set point adjuster 106. Whenever outputs 103 and 105 are not equal, servo 104 acts through a mechanical connection 107 to open or close damper 32, increasing or decreasing the flow of air around rather than over the Baralyme and hence reducing or increasing the carbon dioxide content of the system air.

Analyzer 87 is also a commercially available instrument and supplies an output 110, representative of the partial pressure of oxygen in the air flowing through the analyzer, to an oxygen servo 111. Since analyzer 87 is not influenced by changes in the total pressure, no oxygen computer is necessary. A second output 112 is supplied to servo 111 from a set point adjuster 118. Whenever the outputs 110 and 112 are not equal, servo 111 operates to actuate one or the other of a pair of outputs 113 or 114. If the oxygen content of the air is too low, output 114 operates a valve 115 to admit oxygen to the system at 116 through a conduit 117. Oxygen is supplied to valve 115 from a high pressure cylinder 119 through a conduit 120, a pressure regulating valve 121, and conduit 122.

If the oxygen content of the air is too high, output 113 acts through connections 123, 124, and 125 to start an air pump 126 and open a valve 127, by which means air taken from the system at 128 is exhausted through conduit 130, valve 127, conduit 131, pump 126, and conduit 132. This constitutes the only avenue of escape of matter from the system: in order to completely close the system, it is only necessary for conduit 132 to discharge into a storage chamber, which can later discharge back into the system when the pressure falls too low. This refinement was not considered necessary in the experimental system actually constructed. Pump 126 is only needed when conduit 132 must discharge into a higher pressure than that of the system itself; another example of a system where pump 126 would be necessary is found in submarines.

Operation of servo 111 to discharge air from the system if the partial pressure of oxygen is too great would result in loss of total pressure of the system. To correct this, pressure sensor 101 provides a second output 133 to a pressure servo 134, which receives a further output 135 from a set point adjuster 138. Servo 134 operates, when outputs 133 and 135 are not equal, to actuate one or the other of a pair of outputs 136 and 137. If the total pressure in the system is too high, output 136 acts through connections 123, 124, and 125 to start pump 126 and open valve 127, thus reducing the pressure in the system. It should be emphasized that operation of the valve and pump by the pressure servo and the oxygen servo are mutually independent, either servo being capable of causing this operation.

If the total pressure in the system is too low, on the other hand, output 137 operates a valve 140 to admit nitrogen to the system at 139 through a conduit 141. Nitrogen, or some other physiologically inert gas such as helium, is supplied to valve 140 from a high pressure cylinder 142 through conduit 143, a pressure regulating valve 144, conduit 145, a three-way valve 146, and conduit 148.

As a further feature of this apparatus, a carbon monoxide indicator 147 is shown as actuated at 150 by a carbon monoxide analyzer 151. Air for analyzer 151 passes from conduit 92 through conduit 152, the analyzer, and conduits 153 and 96 to conduit 44.

It is desirable for the inhabitants of the system to be able to check the operation of the gas analyzers, and means are provided to permit this. If valve 90 is operated, conduit 92 is cut off from conduit 91 and is connected through conduit 154, three-way valve 155, conduit 156, pressure regulating valve 157, and conduit 160, to a high pressure cylinder 161 of calibration gas, that is, of a mixture of oxygen, nitrogen, carbon dioxide, and carbon monoxide in which the partial pressures of all the gases are known. A carbon dioxide indicator 162 is actuated as at 163 from analyzer 86, and an oxygen indicator 164 is actuated as at 165 from analyzer 87. By this means, the operation of the analyzers at the normal condition of the atmosphere in the ecological system may be quickly checked.

If it is desired to check the analyzers at zero readings, valve 155 may be operated to disconnect conduit 154 from conduit 156, and to connect it through conduit 166 to valve 146. Now, if the latter is operated, nitrogen passes from cylinder 142 to the gas analyzers, and the zero operation of the indicators can accordingly be checked. When the checking procedure is finished, valves 90, 155, and 146 are returned to their normal positions.

FIGURES 2 and 3 give more details of the structure of elements 80 to 84 in the solid waste disposal apparatus. Burner 80 is shown in FIGURE 2, in longitudinal section, to comprise a bottom 170 and a top 171 joined by a wall 172. Bottom 170 is shown to comprise an outer plate 173 and an inner plate 174 spaced by heat insulating material 175. Top 171 is shown to comprise an outer plate 176 and an inner plate 177 spaced by heat insulating means 180, and to have an opening closed by a cover 181 having an outer plate 182 and an inner member 183 enclosing heat insulating material 184. A gasket 185 of heat resistive material is provided to seal the opening in the top, and the cover is clamped to the top in air tight relation by any suitable means not shown.

Wall 172 is shown to comprise an inner layer 186 and an intermediate layer 187, separated by heat insulating material 190, and an outer layer 191 separated from layer 187 by spaced rings 192 and 193. Ring 192 is perforated as at 194, and ring 193 is perforated as at 195, for reasons presently to be set forth, the perforations being substantially diametrically opposite.

The combustion chamber of burner 80 includes a removable ash bucket 196, an inner wall 197, and an outer wall 200; between the two walls is located a helical electric heater 201 having an input connection 202 and an output connection 203. The chamber may conveniently be circular in transverse section, and passages 204 and 81 are provided through the space between the walls 197 and 204. The unit further includes a thermostat well 205, having a lower opening 198 and enclosing thermostats 208 and 209. A separate enclosure contains the helical electric heater 206 of afterburner 82, which is embedded in silica gel 207 or other suitable material for catalytically promoting oxidization of gases: also embedded in silica gel 207 is the bulb of a further thermostat 216. Heater 206 has an input connection 210 and an output connection 211.

A passage 213 is provided leading from the space above ring 193 between walls 187 and 191 to the space between walls 197 and 200. Air is admitted to the space below ring 192 between walls 187 and 191 by conduit 77 leading from the air pump, and air is expelled from afterburner 82 through a passage 214 traversing wall 172. A baffle 215 extends downward from cover 181 into ash bucket 196.

Scrubber 84 is shown in FIGURE 3 to comprise a chamber 220 closed by an air tight cover 221 and containing water 222. A coil 223 conveying refrigerated brine is submerged in the water in chamber 220, and has an input connection 224 and an output connection 225. A tube 226 carries at its lower portion an inverted cup member 227 perforated as at 230. Tube 226 is connected to passage 214 of burner 80 by conduit 83. Air is led out of scrubber 84 by conduit 85, and a drain connection 231 is provided to connect chamber 220 to the water purifier apparatus presently to be described.

In use of the apparatus, solid wastes collected in combustible plastic or other suitable containers are disposed in ash bucket 196 and cover 181 is closed. Air from the pump passes through conduit 77 into the space below ring 192, thence through perforations 194 into the space between rings 192 and 193 and thence through perforations 195 into the space above ring 193, thus cooling the outer wall of the unit and partially preheating the air. From here the air passes through passages 213 into the space between walls 197 and 200, proceeds downward in a spiral between the convolutions of heater 201, thence through passage 198, upward through thermostat well 205 and through passage 204 into the combustible chamber, being directed downward upon the solid wastes by baffle 215. Products of drying and combustion leave the combustion chamber through conduit 81 and pass through the interstices of the heated silica gel 207 in afterburner 82, thence by passage 214, conduit 83, and tube 226 to member 227, from which gases bubble through openings 230, rise to the surface, and leave the scrubber through conduit 85. As the level of liquid rises due to condensation of water vapor, fluid may overflow to the water purifier through connection 231. Any ash that accumulates in bucket 196 may be removed from time to time as circumstances require.

The electric circuitry for operating heaters 201 and 206 under the control of thormstats 208, 209, and 216, and the brine circulation complex, will be discussed below.

The water purifier of the invention is shown in FIGURES 4 and 5. In the purifying process the contaminated water is chemically treated, filtered, and distilled to remove impurities. The distillate is next frozen to further purify it, the resulting ice is rinsed with a small quantity of pure water and allowed to melt, and the resultant fluid is passed through a deodorizer bed to remove residual trace odors. Water so treated, regardless of its initial condition, has been found to excel natural water in purity both chemically and bacteriologically.

Waste waters are collected in pretreatment chamber 61 from a sink 232 and a relief tube 233: chamber 61 is vented through conduits 57 and 63 to the air purifier. Sulfuric acid and an anti-foam agent are added to chamber 61 through suitable means 235: the chamber is of course constructed of material substantially impervious to chemical attack. When the fluid in chamber 61 reaches a predetermined level, a valve 236 is opened, allowing the treated fluid to pass through a conduit 237 to filter 64, which includes a filter paper element 238 and is vented through conduit 65 and chamber 61. The fluid passes from filter 64 through a shut-off valve 240 and a float valve 241 to boiler 70. A resistance thermometer 242 inserted in filter 64 is used to produce a signal if the fluid in the filter drops below a predetermined level.

Boiler 70 is divided into upper and lower portions by a screen 243, and is provided with electric heaters 244, 245, and 246 and a low level cut out switch 247. Steam generated in the boiler passes through openings in baffle plates 250 and 251 into a superheater 252 having an electric heater 253. Screen 243 and baffle plates 250 and 251 are provided to prevent droplets of raw liquid from entering the superheater, which in turn is provided to kill bacteria. The superheated vapor passes through conduit 71 to condenser 72, and the condensate passes through conduit 73 to receiver 62: the boiler, superheater, condenser, and receiver are vented through conduits 60 and 63. A second resistance thermometer 254 inserted in receiver 62 is used to produce a signal if the fluid in the receiver rises above a predetermined high level.

When a shut-off valve 255 is manually opened, receiver 62 drains through a conduit 256 into freezer 66, which is vented through conduit 67 and receiver 62. In the freezer a radial paddle 257 having blade 258 is rotated by a motor 260. Ice forms on the inner wall of the freezer and becomes progressively thicker: when it is thick enough to exert drag on paddle 257, a cam pin 261 displaces a disk 262 to operate a switch 263, giving a signal that the freezer's purpose has been accomplished. The unfrozen water may now be drained away by pump 290 as described below, and the ice cylinder may be removed, rinsed with clear water if desired, and placed in the melting chamber 264 of FIGURE 5 where it is allowed to melt, the water passing through a deodorizer bed 265 of activated carbon and collecting in a storage chamber 266, from which it may be drawn by opening a valve 267 for drinking, washing, cooking, rinsing ice cylinders, and other general use. In a practical embodiment of the invention, sink 232 is physically located under valve 267.

Operation of the system is enhanced by cooling of the prereatment chamber, filter and gas scrubber, and of course refrigeration is indispensable for the freezer and condenser. Cooling is accomplished by use of brine from an external source, and maintaining the brine at low temperature is a part of the energy management phase not concerned here and is therefore not illustrated. Brine at 40° Farenheit is admitted to the system at an inlet conduit 270 and passes through conduit 271 to a cooling coil 272 surrounding pretreatment chamber 61, thence through a conduit 273 to a cooling coil 274 surrounding filter 64, thence through conduit 275 to condenser 72, and thence through conduit 276, a four-way valve 277, and conduit 280 to an outlet connection 281. The cooling coil of gas scrubber 84 is connected between conduits 270 and 281 by conduits 224 and 225.

Brine at the lower temperature of 15° Farenheit is admitted to the system at an inlet connection 282 and passes through a normally closed solenoid valve 283, conduit 284, valve 277, and conduit 285 to the cooling coil 286 of freezer 66, whence it discharges through conduit 287 to outlet connection 281.

In order to facilitate the removal of ice from freezer 66, the flow of brine may be modified to supply warmer, 40° brine to the freezer. To accomplish this, valve 277 is operated to a second position in which conduit 276 is disconnected from conduit 280 and connected to conduit 285, and the brine discharged from condenser 72 passes through the freezer coils, thawing the ice next to the freezer wall.

After continued operation of the system, it may be desired to replace the residual water in boiler 70; moreover, the condensate from the air cooler and the gas scrubber must be disposed of from time to time, and freezer 66 must be drained. To accomplish these purposes, the input 289 of the water pump 290 driven by a motor 291 is connected to a selector valve 292, so that water may be drawn into the pump from filter 64 through conduit 293, from boiler 70 through conduit 294, from freezer 66 through conduit 295, from the air cooler, through conduits 296 and 297, or from gas scrubber 84, through conduits 296 and 300, valve 301, and connection 231. The outlet of pump 291 passes through conduit 302 to a distribution valve 303 which enables it to be discharged either through conduit 304 to filter 64 for repurification, or through conduits 305 and 69 to unusable stowage container 68.

FIGURE 6 is an electrical circuit diagram of the matter management system. In the embodiment of the invention referred to above it was further convenient for practical reasons to power certain elements with direct current and cerain other elements with alternating current, although this of course is not essential to the invention.

FIGURE 6 accordingly shows a source 290 of direct voltage having its negative terminal grounded at 291 and its positive terminal connected to a switch 292, and a source 293 of alternating voltage having one terminal grounded at 294 and the other terminal connected to a switch 295. Switches 292 and 295 are arranged for simultaneous operation by a mechanical connection 296 to comprise a "POWER" switch 298. When the switches are closed a first supervisory circuit may be traced from source 290 through switch 292, conductors 297, 300, 301, 302 and 303, a "D.C. POWER" pilot light 304, conductors 305, 306, 307, 310, 311 and 312, and ground connections 313 and 291. A second supervisory circuit may be traced from switch 293 through switch 295, conductors 314, 315, 316, 317 and 320, protective resistor 321, conductor 322, an "A.C. POWER" glow lamp 323, conductors 324, 325, 326, 327, 330, 331 and 332 and ground connections 333 and 294.

Operation of the various components of the system is initiated by the use of manual switches in the embodiment of the invention here described, although automatic operation is within the ambit of the inventive contribution here. When a "CATALYZE" switch 334 is closed, a circuit is completed from conductor 317 through conductor 335, 337, switch 334, conductor 340, a thermostat 341, conductor 344, the heater 342 in carbon monoxide catalyzer 53, and conductors 343 to ground connection 333.

A "BURN" switch 345 is shown to comprise a movable contact 346 energized from alternating voltage source 293 through conductors 314, 315, 316, 317, and 335. Contact 346 normally engages a first fixed contact 350, but may be actuated by a mechanical connection 352 out of engagement with this first fixed contact and into engagement with a second fixed contact 253. A switch 355 not shown in FIG. 2 is provided, for safety, and is open except when the cover of burner 80 is securely closed. Then when switch 345 is operated a circuit may be traced through switch blade 346, fixed contact 353, conductor 356, switch 355, and conductor 357 to one switch arm 360a of a timer having further switch arms 361a, 362a, 363a, 364a and 365a. Each switch arm is operable to engage one or the other of two fixed contacts identified by the same reference numerals with suffixes b and c, respectively. Switch arms 360a thru 365a are actuated by a mechanical connection 366 to follow the pattern of operation shown in FIGURE 7. The complete cycle of operation is indicated by the scale of 0 to 100% at the left and the intervals during which the several switches are in their upward positions, as shown in FIGURE 6, are indicated by the cross-hatched bars in FIGURE 7. Initially switch arm 360a makes contact with fixed contact 360c from which a supervisory circuit may be traced through conductors 367, 370, 371, a protective resistor 372, conductor 373, a "BURN" glow lamp 374, and conductor 375 to grounded conductor 326. From contact 360c a further circuit may be traced through conductors 367 and 376, timer motor 377, and conductor 380 to grounded conductor 327. Timer motor 377 actuates contact arms 360a thru 365a by mechanical connection 366, and the cycle of solid waste disposal begins.

The complete cycle requires about 200 minutes and is interrupted once for a period of indefinite length. After 5% of the total period the switch arm 365a operates and a circuit may be traced from movable contact 346 through fixed contact 353, conductors 356, 381, 382, and 383, contacts 365a and 365c, 900° thermostat 216, conductor 384, heater 206, and conductor 385 to grounded conductor 332, thus initiating heating of the afterburner catalyzer bed. After 10% of the total period switch 363a operates, completing a circuit which may be traced from movable contact 346 through fixed contact 353, conductor 381, contacts 363a and 363c, 400° thermostat 208, conductors 386 and 387, burner heater 201, and conductor 388 to grounded conductor 331, thus raising the temperature in the burner to 400° for drying the solid wastes. After 12% of the period switch arm 362a operates completing a circuit which may be traced from movable contact 346 through fixed contact 353, conductor 356, switch 355, conductors 357 and 389, contacts 362a and 362c, conductor 390, air pump 76, and conductor 391 to grounded conductor 330, thus starting the air pump to assist in the drying process. After 45% of the period switch arm 364a operates completing a circuit which may be traced from movable contact 346 through fixed contact 353, conductors 356, 381 and 382, contacts 364a and 364c, 900° thermostat 209, conductor 387, heater 201, and conductor 388 to grounded conductor 331. By this switch operation the 900° thermostat is connected in shunt with the 400° thermostat, which results in raising the temperature in the burner to 900° for completing the combustion of the solid wastes. At the end of 60% of the period switch arm 363a disengages contact 363c, but because of engagement between contacts 364a and 364c no change in the operation of the system occurs. After 70% of the period switch arm 361a operates, completing a circuit from fixed contact 350 through conductor 392, contacts 361a and 361c to conductor 393. However at this time fixed contact 350 is not energized, and no change in operation of the system takes place. After 75% of the period switch arms 364a and 365a disengage fixed contacts 364c and 365c, thus de-energizing the burner and afterburner heaters. After 80% of the period switch arm 360a and 362a disengage fixed contacts 360c and 362c, thus interrupting operation of the timer, and shutting off the air pump. Manual operation of "BURN" switch 345 to its "Reset" position is now necessary, and when it is performed movable contact 346 engages fixed contact 350, and a circuit is completed to timer motor 377 and lamp 374 through contacts 361a and 361c, and the cycle of operation is resumed. After 90% of the period switch arm contact 360a again engages 360c, but since switch arm 360a is not energized at this time, no change in the operation of the system takes place. At the end of 100% of the cycle switch arm 361a disengages fixed contact 361c, and the initial condition of the system is restored.

The purpose of the interruption in the cycle of operation is basically to insure that only one cycle is performed, since inadvertance might otherwise lead to continuous repetition of the burning cycle. The switching arrangement disclosed interrupts the cycle when its function is completed and requires a deliberate act, namely operating "BURN" switch 345 from its "Normal" to its "Reset" position, to prepare the timer for repeating the operating cycle.

The direct voltage portion of the apparatus includes a first resistance bridge 394 having input terminals 395 and 396 and output terminals 397 and 400, and a second resistance bridge 401 having input terminals 402 and 403 and output terminals 404 and 405. Bridge 394 is energized by conductors 406 and 407, and includes resistors 410, 411 and 412 and resistance thermometer 254: connected in series with a rectifier 413 between output terminals 397 and 400 is the winding 414 of a relay having normally closed contacts 414a and 414b presently to be described. Bridge 401 is energized through conductors 415 and 416 and includes resistors 417, 420 and 421 and resistance thermometer 242: connected in series with a rectifier 422 between output terminals 404 and 405 is the winding 423 of a relay having normally closed contacts 423a and 423b presently to be described. The arrangement is such that when resistance thermometer 242 is not covered by fluid in filter 64, relay contact 423a disengages contact 423b, while when resistance thermometer 254 is covered with fluid, contact 414a disengages contact 414b. Since switches 292 and 295 are shown open in FIGURE 6, relays 414 and 423 are both de-energized and their contacts are shown accordingly.

When receiver 61 is nearly full, valve 236 of FIGURE 2 is opened and fluid is allowed to pass into filter 64, where it passes through the filter paper element 238 and collects in the bottom of the chamber. When the level of the fluid rises to the point where resistance thermometer 242 is immersed in fluid, relay 423 operates, closing contacts 423a and 423b. By placing element 242 above element 238, the latter is never allowed to dry out. Whenever it is desired, valve 240 may be opened, allowing fluid to pass from the filter into the boiler 70 through float valve 241, which rises to close the opening from valve 240 when the level in the boiler reaches a predetermined amount.

Referring now to FIGURE 6, the next step is to close "DISTILL" switch 424 which completes a circuit which may be traced from conductor 300 through conductor 425, normally closed relay contacts 414b and 414a, conductor 426, relay contacts 423a and 423b now closed, low level cut off switch 247, conductor 427, switch 424, conductor 430, a relay winding 431 and conductor 432 to grounded conductor 311: a "DISTILL" pilot light 433 is connected across relay winding 431 by conductors 434 and 435. Relay winding 431 actuates a movable contact 431a into engagement with a fixed contact to complete four circuits. The first circuit may be traced through conductor 437, superheater 253, and conductors 440, 441, 442, and 443 to grounded conductor 444. The second circuit may be traced through conductor 451, a manual switch 452, conductor 453 and boiler heater 244, to grounded connection 441. The third circuit may be traced through conductor 455, a manually operated switch 456, conductor 457, and boiler heater 245 to grounded conductor 442. The fourth circuit may be traced through conductor 461, a manual switch 462, conductor 463 and boiler heater 246 to grounded conductor 443. It is thus evident that the degree of heat available in boiler 70 may be regulated by closing a desired number of switches 452, 456 and 462.

Fluid distilled out of boiler 70 passes into receiver 62: if the amount of fluid in receiver 62 is allowed to increase until resistance thermometer 254 is immersed in fluid, relay 423 is energized and contact 423a disengages contact 423b de-energizing relay 431 and hence shutting off electrical energy to heat the boiler and superheater.

When sufficient fluid has collected in receiver 62, valve 255 may be opened to allow the fluid to pass into freezer 66, and "FREEZE" switch 464 is closed. Switch 464 comprises a pair of movable contacts 465 and 466 unitarily actuated by a mechanical connection 467 into engagement with fixed contacts 470 and 471, respectively, and alternating current from source 293 may now follow a circuit including conductor 472, switch contacts 471 and 466, conductor 473, the normally closed contacts 474a and 474b of a relay presently to be described, conductors 475 and 476, motor 260, and conductors 477, 480, 481 and 482 to grounded conductor 444. Also energized at this time through further conductor 484, a protective resistor 485 and conductor 486 is a "FREEZE" glow lamp 487, a circuit for which is completed through conductors 490 and 491 to grounded conductor 481.

Motor 260 is shown to comprise a pair of windings 492 and 493 and a phasing capacitor 494, and to drive switch 263 through a connection 495 representative of members 261 and 262 in FIGURE 5. Switch 263, FIGURE 6, is normally open: when it is closed by motor 260, a circuit is completed from positive source 290 through switch 292, conductors 297 and 496, switch contacts 470 and 465, conductors 497 and 500, switch 263, conductors 501, 502, and 503, relay winding 474, and conductor 504 to ground connection 313. A "MELT" indicating lamp 505 is connected across relay winding 474 by conductors 506 and 507. When relay winding 474 is energized, a movable contact 474d is actuated into engagement with a fixed contact 474f, in shunt with switch 263, to complete a holding circuit for the relay winding, and movable contact 474a is displaced out of engagement with a fixed contact 474b, thus disabling motor 260. Refrigerator operation cannot be resumed until freezer switch 464 is first opened, deenergizing relay winding 474 and thus interrupting the holding circuit through relay contacts 474d and 474f.

When lamp 505 lights, it is an indication that valve 277 of FIGURE 4 should be opened, substituting warm brine for the freezing brine and thawing the ice next to the surface of the freezer.

When it is desired to transfer fluid from the various chambers making up the system by use of pump 290, valves 292 and 303 are set to the desired positions and operation of motor 291 is brought about by closing "PUMP" switch 510 which completes a circuit shown in FIGURE 6 from conductor 315 through conductor 511, switch 510, conductors 512 and 513, motor 291, and conductor 514 to grounded conductor 482: motor 291 is shown to comprise a pair of windings 515 and 516 and a fixing capacitor 517. Connected in shunt with motor 291 is a supervisory circuit including conductor 520, protective resistor 521, conductor 522, a "PUMP" glow lamp 523 and conductor 524.

The operation of the system has been recited in detail as the various elements making up the system have been described and will not be repeated.

Numerous objectives and advantages of our invention have been set forth in the foregoing description, together with details of the structure and function of the invention, and the novel features thereof are pointed out in the appended claims. The disclosure, however, is illustrated only, and we may makes changes in detail, especially in matters of shape, size, sources of energy, and arrangement of parts, within the principle of the invention, to the full extent indicated by the broad general meaning of the terms in which the appended claims are expressed.

We claim as our invention:

1. Matter management equipment for an inhabited, substantially sealed environment in which pollution of air and water occurs and solid wastes accumulate comprising, in combination: a solid waste disposal unit the operation of which consumes oxygen from the environmental air and results in pollution of the environmental air and in production of polluted water; a unit for purifying the environmental water, including said polluted water the operation of which results in pollution of the environmental air; and a unit for purifying the environmental air including means for removing gaseous and vaporous pollutants and airborne particles, and for restoring consumed oxygen.

2. Matter management equipment for an inhabited, substantially sealed environment in which pollution of air and water occurs and solid wastes accumulate comprising, in combination: a solid waste disposal unit the operation of which consumes oxygen from the environmental air and results in pollution of the environmental air and in production of polluted water and in residual stored solids; a unit for purifying the environmental water, including said polluted water the operation of which results in pollution of the environmental air and in residual stored liquid; and a unit for purifying the environmental air including means for removing gaseous and vaporous pollutants and airborne particles, and for restoring consumed oxygen.

3. Matter management equipment for an inhabited, substantially sealed environment in which pollution of air and water occurs and solid wastes accumulate comprising, in combination: a solid waste disposal unit the operation of which consumes oxygen from the environmental air and results in pollution of the environmental air and in production of polluted water; a unit for purifying the environmental water, including said polluted water the operation of which results in pollution of the environmental air; a unit for purifying the envirnomental air including means for removing gaseous and vaporous pollutants and airborne particles, and for restoring consumed oxygen; and means for maintaining environmental air pressure.

4. Matter management equipment for an inhabited, substantially sealed environment in which pollution of air and water occurs and solid wastes accumulate comprising, in combination: a solid waste disposal unit the operation of which consumes oxygen from the environmental air and results in pollution of the environmental air and in production of polluted water; a unit for purifying the environmental water, including said polluted water the operation of which results in pollution of the environmental air; and a unit for purifying the environmental air including means for removing airborne particles, means for adsorbing vaporous pollutants and carbon dioxide, and means for restoring consumed oxygen by realease of stored oxygen into the environment.

References Cited by the Examiner

UNITED STATES PATENTS

| | | | |
|---|---|---|---|
| 645,790 | 3/1900 | Conover. | |
| 1,379,221 | 5/1921 | Scott. | |
| 1,763,567 | 6/1930 | Simmon et al. | 62—136 |
| 1,860,298 | 5/1932 | Stelzner. | |
| 2,097,649 | 11/1937 | Solberg. | |
| 2,181,199 | 11/1939 | Otterson. | |
| 2,185,596 | 1/1940 | Kleinschmidt. | |
| 2,306,382 | 12/1942 | Fink. | |
| 2,340,721 | 2/1944 | Whitney | 62—58 X |
| 2,541,814 | 2/1951 | Gaddini | 62—136 |
| 2,557,813 | 6/1951 | Burton | 62—136 |
| 2,733,196 | 1/1956 | Hillier et al. | |
| 2,759,882 | 8/1956 | Worthen. | |
| 2,845,882 | 8/1958 | Bratton | 110—8 |
| 2,895,433 | 7/1959 | Michaelis | 110—8 |
| 2,896,419 | 7/1959 | Thompson | 62—58 |
| 3,067,270 | 12/1962 | Weedman. | |
| 3,121,626 | 2/1964 | Zarchin. | |

NORMAN YUDKOFF, *Primary Examiner.*

MILTON STERMAN, GEORGE MITCHELL,
*Examiners.*

M. H. SILVERSTEIN, W. L. BASCOMB, R. GAUDET,
*Assistant Examiners.*